(12) United States Patent
Philipp et al.

(10) Patent No.: US 12,496,144 B2
(45) Date of Patent: Dec. 16, 2025

(54) TOOL-TYPE AGNOSTIC ASSISTANCE FUNCTIONALITY FOR SURGICAL OPERATIONS

(71) Applicant: Carl Zeiss Meditec AG, Jena (DE)

(72) Inventors: Markus Philipp, Oberkochen (DE); Stefan Saur, Oberkochen (DE)

(73) Assignee: Carl Zeiss Meditec AG, Jena (DE)

( * ) Notice: Subject to any disclaimer, the term of this patent is extended or adjusted under 35 U.S.C. 154(b) by 391 days.

(21) Appl. No.: 18/262,769

(22) PCT Filed: Jan. 25, 2022

(86) PCT No.: PCT/EP2022/051576
§ 371 (c)(1),
(2) Date: Jul. 25, 2023

(87) PCT Pub. No.: WO2022/161930
PCT Pub. Date: Aug. 4, 2022

(65) Prior Publication Data
US 2024/0407861 A1    Dec. 12, 2024

(30) Foreign Application Priority Data
Jan. 26, 2021  (DE) ................... 10 2021 101 694.0

(51) Int. Cl.
*A61B 34/00* (2016.01)
*A61B 90/20* (2016.01)
(Continued)

(52) U.S. Cl.
CPC .............. *A61B 34/25* (2016.02); *A61B 90/20* (2016.02); *A61B 90/90* (2016.02); *A61B 2034/254* (2016.02)

(58) Field of Classification Search
CPC ........... A61K 35/12; G06K 9/00; A61B 34/00
(Continued)

(56) References Cited

U.S. PATENT DOCUMENTS 12,268,472 B2 *  4/2025  Dickie ................. A61B 5/6898
12,383,124 B2 *  8/2025  Edrei ....................... A61B 1/04
(Continued)

FOREIGN PATENT DOCUMENTS

EP        3767535 A1    1/2021
JP     2018181333 A   11/2018
(Continued)

OTHER PUBLICATIONS

International Search Report and Written Opinion, Application No. PCT/EP2022/051576, mailed May 13, 2022. ISA/European Patent Office.

(Continued)

*Primary Examiner* — Seyed H Azarian
(74) *Attorney, Agent, or Firm* — Honigman LLP; Brett A. Krueger

(57) ABSTRACT

The invention relates to techniques for controlling an assistance functionality for a surgical operation on a patient. A machine-trained algorithm is used to obtain a map (76) of an operation region. This map can be used to control an assistance functionality in the context of the surgical operation. The map is indicative of one or more activity regions (101-103), which are associated with an increased probability of the presence of surgical instruments.

14 Claims, 7 Drawing Sheets

(51) Int. Cl.
*A61B 90/90* (2016.01)
*A61K 35/12* (2015.01)
*G06K 9/00* (2022.01)

(58) Field of Classification Search
USPC ........ 382/100, 103, 106, 128–132, 153–154,
382/158, 162, 168, 173, 181, 219, 224,
382/254, 276, 285–291, 256; 378/4, 21,
378/43
See application file for complete search history.

(56) References Cited

U.S. PATENT DOCUMENTS

| | | | |
|---|---|---|---|
| 2017/0046842 A1* | 2/2017 | Yamaguchi | A61B 1/000095 |
| 2018/0307034 A1* | 10/2018 | Saur | G06T 7/254 |
| 2021/0015554 A1 | 1/2021 | Chow et al. | |
| 2021/0335483 A1* | 10/2021 | Freeman | G16H 50/20 |
| 2022/0346650 A1* | 11/2022 | Novak | A61B 1/046 |
| 2023/0363830 A1* | 11/2023 | Polchin | A61B 5/7425 |

FOREIGN PATENT DOCUMENTS

| | | |
|---|---|---|
| JP | 2020058779 A | 4/2020 |
| JP | 2020130607 A | 8/2020 |
| WO | 2020084611 A1 | 4/2020 |
| WO | 2020170866 A1 | 8/2020 |

OTHER PUBLICATIONS

Evangello Flouty et al. "CaDIS: Cataract Dataset for Image Segmentation" arxiv.org, Cornell University Library, 201 Olin Library Cornell University Ithaca, NY 14853, Jun. 27, 2019 (Jun. 27, 2019), XP081387776.

German Office Action, Application No. 10 2021 101 694.0, dated Oct. 14, 2021.

* cited by examiner

TOOL-TYPE AGNOSTIC ASSISTANCE FUNCTIONALITY FOR SURGICAL OPERATIONS

CROSS-REFERENCE TO RELATED APPLICATIONS

This application is the U.S. national stage of PCT/EP2022/051576, filed on Jan. 25, 2022, which claims priority of German Patent Application No. 10 2021 101 694.0, filed on Jan. 26, 2021. The disclosures of these prior applications are considered part of the disclosure of this application and are hereby incorporated by reference in their entireties.

TECHNICAL FIELD

Various examples of the disclosure relate to techniques for controlling an assistance functionality in connection with a surgical intervention on the basis of microscopy images of a surgical microscope.

BACKGROUND

The prior art has disclosed surgical microscopes that offer very different items of information to a user, generally the surgeon, in the eyepiece. By way of example, DE 10203215 A1 describes a surgical microscope that comprises a camera which generates an electronic image signal. The image signal is displayed on an electronic eyepiece which comprises a corresponding display apparatus for the electronic image data. Further items of information may also be output there. A surgical microscope is also known from DE 10 2014 113 935 A1.

Typical surgical microscopes have a multiplicity of possible settings. It can often require much outlay to choose a good setting during the operation.

The disclosure of the document EP3593704 is known, inter alia, which discloses an assisting endoscope which derives actions on the basis of image processing and a database of previous surgeries. A manually created database is used in this case. Such techniques often have restricted flexibility and are therefore sometimes inaccurate.

BRIEF SUMMARY OF THE DISCLOSURE

Therefore, there is a need for improved techniques to control an assistance functionality in connection with a surgical intervention. In particular, there is a need to control assistance functionalities in connection with the control of a surgical microscope used during the surgical intervention.

This object is achieved by the features of the independent patent claims. The features of the dependent patent claims define embodiments.

A description is given below of techniques for providing assistance during a surgical intervention—in particular during microsurgical interventions, for example in the head area, eye area, heart area, spinal column (neurology), ear, nose and throat area or dental area—by means of computer-implemented algorithms.

For this purpose, an assistance functionality is controlled in a suitable manner. The assistance functionality may control in an automated manner one or more pieces of equipment used during the surgical intervention. A surgical microscope could be controlled. The assistance functionality could also provide a user interaction, for instance give instructions, etc.

In the various examples, for example, one or more actions of the assistance functionality could be initiated. A point in time at which the one or more actions are initiated could be determined. A type of the action could also be determined.

For the purpose of controlling the assistance functionality, microscopy images of a surgical microscope are used in order to obtain a map of an intervention region imaged by the microscopy images.

The map—put generally—can be indicative of a temporal context and/or a spatial context of one or more activity areas which were recognized in the intervention region on the basis of the microscopy images. An increased activity can be ascertained in the activity areas in comparison with other areas within the intervention region. In other words, the map can have a multiplicity of areas, wherein some areas can be determined as activity areas if they have an increased activity or dynamic characteristic in comparison with the other areas of the map. An increased dynamic characteristic can be brought about in particular by the movement of surgical instruments in the corresponding activity area.

Such techniques are based on the insight that changes over time in the microscopy images can be caused in particular by movement of surgical instruments (also referred to as tools). Various examples described herein are based on the insight that it may be unnecessary to explicitly recognize a type of the surgical instruments used in order to control an assistance functionality in connection with the surgical intervention. Rather, it is possible just to determine the presence or absence of surgical instruments in the different zones in the intervention region, on the basis of a comparison of microscopy images—for instance in accordance with the following principle: "Places where something is moving are potential positions at which the surgical instruments are situated". In other words, the map can be tool-type agnostic, i.e. does not differentiate between different types of surgical instruments, for example. In this way, therefore, the map determining the one or more activity areas can be determined on the basis of the temporal context of the microscopy images. An assistance functionality can then be controlled on the basis of this map. In particular, the surgical microscope could be repositioned, for example. This can take place under the precondition that surgical instruments were recognized in the microscopy image.

In accordance with one example, a method for controlling an assistance functionality for a surgical intervention on a patient comprises applying a machine-learned algorithm. That is based on at least two microscopy images which were captured by means of a surgical microscope. The at least two microscopy images image an intervention region of the surgical intervention. The at least two microscopy images are captured at different points in time, that is to say e.g. at two or more points in time. On the basis of applying the machine-learned algorithm, a map of the intervention region is obtained. This map is indicative of one or more activity areas in the intervention region. The one or more activity areas are associated with an increased probability for the presence of surgical instruments. The method additionally comprises using the map in order to control an assistance functionality in connection with the surgical intervention.

As a general rule, it would be conceivable for one or more maps to be determined. Hereinafter the techniques are described for a single map, for reasons of simplicity. However, corresponding techniques can be duplicated for a plurality of maps. As a general rule, it would be conceivable for a plurality of intervention regions to be considered, by using e.g. a plurality of maps, e.g. one per intervention region.

The at least two microscopy images can be selected for example from the group comprising: mono images; stereo images; images that encode depth information. Stereo images can encode depth information. Put generally, therefore, the at least two microscopy images can optionally encode further information, for instance depth information. Suitable imaging modalities can be used for this purpose. For example, corresponding information could be captured by means of time-of-flight imaging and/or structured illumination and/or stereo imaging. In the case of structured illumination, illumination patterns can be projected onto the intervention region and the depth information can be ascertained on the basis of a distortion of the illumination patterns on account of the topography of the intervention region. By way of example, a corresponding topography image could be generated on the basis of such encoded depth information in each case for each microscopy image in a preprocessing step, which topography image can then be used as input for the machine-learned algorithm.

Different types of machine-learned algorithms can be used in the various examples described herein. In particular, for example deep neural networks can be used, for example convolutional neural networks.

A time interval between the different points in time at which the microscopy images are captured can correspond to a time scale on which surgical instruments are typically moved by a surgeon. That is to say that the time interval can be for example in the seconds range, i.e. can be for example in the range of 200 ms to 5 seconds.

The activity areas can thus denote such areas in which there is an increased probability—in comparison with other areas within the intervention region—of the surgical instruments being positioned.

Such techniques are based on the insight that the surgical instruments are moved as a function of time, thus resulting in a temporally variable contrast in the microscopy images. The activity areas can be determined by taking account of the temporally variable contrast. The background—anatomical features of the patient—may often typically be comparatively static.

The map, put generally, can represent specific features of the semantic context depicted by the at least two microscopy images, abstracted from the imaging modality of the surgical microscope that is used for capturing the microscopy images. The map can thus extract features from the at least two microscopy images—and optionally on the basis of further inputs in the machine-learned algorithm. The map can be correctively adjusted, for example, so that noise or disturbances included in the at least two microscopy images are not used as features of the map. The contrast of microscopy images typically depends on the imaging modality used. The map can abstract the contrast.

The map and the at least two microscopy images can be defined in a common reference coordinate system. This makes it possible to effect an assignment between the positions of the features indicated by the map—for instance the activity areas—and the corresponding positions in the at least two microscopy images. The microscopy images image a field of view of the surgical microscope. Said field of view can encompass the intervention region.

Such techniques are based on the insight that it may be helpful to control the assistance functionalities on the basis of an identification of the one or more activity areas. For controlling the assistance functionalities, it is often particularly helpful if the presence and in particular positioning of surgical instruments in the intervention region is used as a basis for a decision. Various examples are based on the insight, in particular, that the presence of surgical instruments in specific activity areas in the intervention region may be more important for accurate control of the assistance functionality than a differentiation between different types of surgical instruments.

In this respect, in various examples it may be possible for the map to be agnostic concerning different types of surgical instruments, i.e. not to differentiate between different types of surgical instruments (tool-type agnostic map). In this case, the type of the surgical instruments means e.g. the geometry, the appearance and the functionality made possible by the surgical instruments. Types of surgical instruments may be, for example: knives; scissors; clamps; scalpel; aspirator; tweezers; CUSA; bone punch; etc. However, the type of surgical instruments is not intended to be dependent on the surgeon. That means in other words that the type of surgical instruments is not intended to be dependent on the specific role of the surgical instruments in a concrete instance of an operation. For example, a specific type of surgical instruments, for example a knife, may be used by different surgeons in a wide variety of ways; for example, a knife could be held differently, moved differently, i.e. with different movement patterns, etc. by different surgeons. However, such a use of the surgical instruments can define the activity areas and be represented by the map in this respect.

That means in other words that although the activity areas may indicate the presence of surgical instruments, the map does not include corresponding features which would differentiate between different types of surgical instruments.

It has been established that robust control of assistance functionalities is possible particularly if a differentiation between the different types of surgical instruments is not made. This may be due to the fact, in particular, that the appearance of surgical instruments may vary significantly, even for surgical instruments of the same type. By way of example, the coloration and shaping of surgical instruments may vary greatly depending on the manufacturer. It has been observed that the reliability of the control of the assistance functionality is detrimentally affected if a differentiation between different types of surgical instruments is taken into account, since a further error source is generated in this way. The machine-learned algorithm can be trained more robustly if a differentiation between the different types of surgical instruments is not demanded. Therefore, in the various examples it is possible that the assistance functionality is controlled agnostically concerning the different types of surgical instruments, i.e. is not intended to be controlled depending on the different types of surgical instruments.

The activity areas can be rendered in the map in various ways.

For example, it would be conceivable for the map to include probability values for the presence or the absence of surgical instruments for a plurality of areas of the intervention region. This would correspond to a probability map. The activity areas can be indicated in this way. In this case, the one or more activity areas can then be localized at such areas which have increased probability values.

It would be possible for the presence of surgical instruments to be checked, without the surgical instruments being localized. Depending on whether surgical instruments are recognized, an assistance functionality could then be initiated selectively; or different assistance functionalities could be initiated, depending on whether or not surgical instruments are recognized. Such a variant is based on the insight that surgical instruments can be recognized robustly; localization is not required since the map that is indicative of the activity areas can be used for a spatial component of the assistance functionality. That is based on the insight that if surgical instruments are present in the microscopy images, in general the increased activity is initiated by the surgical instruments (and there is thus no need for separate localization of the surgical instruments in addition to the determination of the map, for example on the basis of the optical flow). That means that the recognition of the presence of surgical instruments can be used for plausibilization that an increased activity in the activity area is actually caused by surgical instruments (rather than by other disturbances).

The machine-learned algorithm can have a regression layer in order to output continuous probability values.

In this way, it may be possible to specify a probability distribution for the positioning of the activity areas in the intervention region. The assistance functionality can be controlled in a more differentiated manner in this way.

For example, techniques in connection with the machine-learned algorithm such as are known in principle in connection with the so-called "saliency" analysis could be used in connection with such probability values. See e.g. Reddy, Navyasri, et al. "Tidying deep saliency prediction architectures." arXiv preprint arXiv:2003.04942 (2020). Artificial deep neural networks, for example, can be used in this case. These networks can have an encoding branch that converts the image information into a dimensionality-reduced feature vector or feature matrix. That can optionally be followed by decoding for upsampling to a desired resolution. The latent features of the encoding can be defined in an application-specific manner in this case. As an alternative or in addition to the use of probability distributions for indicating activity areas, deterministic localization could also be carried out. By way of example, a binary differentiation could be made in regard to whether specific positions are localized within or outside an activity area. The machine-learned algorithm can comprise a classification layer for binary classification. In this regard, a mask could be used for the one or more activity areas. Said mask can provide a binary discrimination between different positions in the intervention region, i.e. specify in each case whether a specific position in the intervention region is situated within or outside an activity area.

The map—put generally—can thus include the activity areas as corresponding features. Besides the features of the map which designate the one or more activity areas, the map could also include even further other features, for instance positions of anatomical features of the patient, reference points in the field of view of the surgical microscope—such as, for example, the center of the field of view—etc. However, as an alternative or in addition to such features which are not connected with the activity areas, it is possible for the map to comprise one or more further features which indicate context information for the one or more activity areas.

Various types of features are conceivable here. It would be possible for the map to comprise—as further feature besides the one or more activity areas—features which are indicative of fulfillment of one or more spatial neighborhood relationships by groups of activity areas of the one or more activity areas. The map could indicate two or more activity areas, for example. A group of activity areas can accordingly include two or more activity areas. A check could then be made, by means of the machine-learned algorithm, to ascertain whether the activity areas of a group fulfill specific criteria in connection with the relative spatial arrangement (spatial neighborhood relationship). For example, a check could be made to ascertain whether a distance between the activity areas of a respective group is smaller than a predefined threshold value, that is to say that the activity areas are situated comparatively close together (which could be indicative of surgical instruments positioned closely next to one another). Other neighborhood relationships would concern for example an average distance between the activity areas closest to each other in the same group.

The additional identification of the fulfillment of spatial neighborhood relationships by the activity areas of a group in connection with the map makes it possible to take account of corresponding context information when controlling the assistance functionality on the basis of the map. It has been established, for example, that in some variants it may be helpful for spatial clusters of activity areas that are close together to be taken into account to an increased extent in the control of the assistance functionality, for example in comparison with such activity areas which are arranged in isolation at a large distance from other activity areas in the intervention region.

Besides such neighborhood relationships which are defined within the set of activity areas themselves, neighborhood relationships which are defined in connection with the arrangement of the one or more activity areas in the anatomy of the patient can alternatively or additionally be taken into account as well. The map could accordingly include features which are indicative of fulfillment of one or more anatomical neighborhood relationships of activity areas of the one or more activity areas. By way of example, such activity areas which are arranged comparatively close to protected anatomical regions—for instance sensitive organs—could be identified. Such activity areas which are positioned particularly close to an anatomical target region—for instance a tumor to be removed—could also be identified.

It has been established that such an anatomical context can be useful in reliably controlling an assistance functionality. By way of example, an increased attentiveness of the surgeon may be assumed for such activity areas which are close to sensitive organs, etc. For example, such activity areas which are arranged particularly close to sensitive anatomical features of the patient, or which are close to the target region of the surgical intervention, could be taken into account to a greater degree in the control of the assistance functionality. This is based on the insight that such activity areas typically require the increased attentiveness of a surgeon. Furthermore, in this way an order of the plurality of activity areas could be defined and the assistance functionality could be implemented purposefully in connection with activity areas at higher hierarchical levels defined in accordance with the order.

Further features which the map can optionally include, and which provide context information for activity areas, would concern for example the number of surgical instruments in activity areas.

It may sometimes happen that a plurality of surgical instruments are used in an overlaid or adjoining manner relative to one another. It would then be possible for the map to indicate how many corresponding surgical instruments are encompassed by the corresponding activity area. The machine-learned algorithm can perform a corresponding classification/regression.

For example, an activity area with comparatively many surgical instruments arranged therein could require an increased attentiveness of the surgeon—for instance in comparison with an activity area with comparatively few surgical instruments arranged therein. An order of the plurality of activity areas could also be defined on the basis of such an indication of the number of surgical instruments used per activity area. For example, it would be conceivable for such activity areas in which a larger number of surgical instruments are positioned to be established at a higher hierarchical level of the order.

The map—as an alternative or in addition to the feature classes mentioned above—could also be indicative of a dynamic characteristic, for example an increased activity or increased dynamic characteristic, or increased/greater movement, in particular of image parts/elements, in the activity areas of the one or more activity areas. For example, it would be conceivable for specific surgical instruments—for instance clamps for fixing tissue—to be positioned comparatively statically; whereas other surgical instruments—for instance an aspirator—are guided manually and thus positioned comparatively dynamically. This can be expressed in the dynamic characteristic within the different activity areas—for instance quantified by the intensity of the optical flow between the different microscopy images, the type of surgical instruments not being trained and/or not being recognized by the model or the algorithm.

Typically, such surgical instruments which have a high dynamic characteristic in terms of the positioning may be comparatively important for the surgeon, for instance in the case of surgical instruments guided by hand. It would be conceivable for an order between the activity areas also to be determined taking account of the dynamic characteristic of the surgical instruments in the activity areas.

Put generally, it would be possible for the method to furthermore comprise determining an order of the one or more activity areas.

The order can be determined on the basis of the one or more features which comprise context information for the one or more activity areas. The assistance functionality can then be controlled depending on the order.

The order can thus define a hierarchy between the activity areas. Activity areas at higher hierarchical levels can influence the control of the assistance functionality to a greater degree than assistance areas at lower hierarchical levels.

Conflicts of aims, in particular, can be resolved by such techniques. For example, if there are a plurality of different activity areas arranged at a distance from one another, then only one of these activity areas can be positioned in the center of the field of view of the surgical microscope at each given point in time. The corresponding conflict of aims can then be resolved if—in accordance with the order—the "most important" activity area is positioned in the center of the field of view. This enables particularly good control of the assistance functionality, adapted to the requirements of the surgical intervention.

The order could be determined by the machine-learned algorithm, for example. However, it would also be conceivable for the order to be determined by a downstream control algorithm.

Various examples have been discussed above in connection with the map which is created on the basis of at least two microscopy images and which includes features associated with one or more activity areas. The machine-learned algorithm creates this map on the basis of an input.

This input is based on the at least two microscopy images. In one variant, it would be conceivable for the machine-learned algorithm to obtain the at least two microscopy images directly as input. For example, the at least two microscopy images could be transferred as separate channels to the machine-learned algorithm. Alternatively or additionally, however, further or other information that the machine-learned algorithm obtains as input could also be determined on the basis of the at least two microscopy images.

In the various examples, preprocessing of the at least two microscopy images in order to obtain the input of the machine-learned algorithm can be effected by a computer-implemented preprocessing algorithm.

For example, depth information could be used in order to create a topography image of the intervention region, for instance by means of the preprocessing algorithm. Depth information could be generated for example by means of stereo imaging, time-of-flight imaging and/or structured illumination. Such a determination could also be carried out before a combination image is ascertained, as described below.

It would be possible for a combination image to be determined on the basis of a combination of the at least two microscopy images and for the machine-learned algorithm to obtain this combination image as input.

The combination image can comprise optical flow values as a difference measure between the microscopy images of the at least two microscopy images. Spatial information is generally removed in the case of an optical flow image. The optical flow can encode the movement of image points. The optical flow can describe e.g. a vector field which specifies the speed—projected into the image plane—of visible points of the object space in the reference system of the imaging optical unit. A corresponding combination algorithm for determining an optical flow image can operate image point by image point or block by block, for example. One exemplary combination algorithm for obtaining an optical flow image as a specific form of the combination image is described e.g. in: Sun, D., Yang, X., Liu, M. Y., & Kautz, J. (2018). Pwc-net: Cnns for optical flow using pyramid, warping, and cost volume. In Proceedings of the IEEE conference on computer vision and pattern recognition (pp. 8934-8943). A further exemplary combination algorithm for obtaining an optical flow image as a specific form of the combination image is described e.g. in: Hui, T. W., Tang, X., & Loy, C. C. (2018). Liteflownet: A lightweight convolutional neural network for optical flow estimation. In Proceedings of the IEEE conference on computer vision and pattern recognition (pp. 8981-8989). A further exemplary combination algorithm for obtaining an optical flow image as a specific form of the combination image is described e.g. in: Ilg, E., Mayer, N., Saikia, T., Keuper, M., Dosovitskiy, A., & Brox, T. (2017). Flownet 2.0: Evolution of optical flow estimation with deep networks. In Proceedings of the IEEE conference on computer vision and pattern recognition (pp. 2462-2470).

As a general rule, in the various examples described herein, combination algorithms can thus be used which, on the basis of two or more microscopy images, determine a combination image which has optical flow values as contrast, i.e. specifies the optical flow. In this case, such combination algorithms can take account of the fact that—besides the surgical instruments—the background may also have a degree of movement. In this case, however, it is possible for the machine-learned algorithm that creates the map to be able to differentiate between background and surgical instruments on the basis of the optical flow image. This is due to the fact that the characteristics of the optical flow values for surgical instruments are typically different than the characteristics of the optical flow values for background. As an example: Continuous homogeneous areas in the vector field of the optical flow indicate surgical instruments; the background does not move or moves in a different direction than instruments (e.g. if only 1 of 2 instruments touches the background); large difference regarding magnitude of the movement in respect of instruments in comparison with background, i.e. the background often moves to a lesser extent; there are high gradients in the optical flow for the surgical instruments.

In order that the machine-learned algorithm that determines the map and a combination algorithm that determines the combination image having optical flow values as contrast cooperate well, end-to-end training of both algorithms would be conceivable.

In the various examples described herein, it would be possible for the at least two microscopy images to have been captured with the same pose of the surgical microscope in relation to the intervention region—that is to say the same distance and the same orientation of an imaging optical unit of the surgical microscope in relation to the intervention region. In one such example, the combination image could be obtained directly by forming the difference between the at least two microscopy images.

In other examples, however, it would also be conceivable for the at least two microscopy images to have been captured with different poses of the surgical microscope in relation to the intervention region. In one such example, registration of the at least two microscopy images to a common coordinate system could be carried out, followed by transformation into the common coordinate system on the basis of the registration. The correspondingly transformed at least two microscopy images can then be combined with one another in order to obtain the superimposed microscopy image.

Various variants have been described above in which the input of the machine-learned algorithm is based on the at least two microscopy images. Optionally, one or further inputs that are not based on the at least two microscopy images can also be used.

By way of example, the machine-learned algorithm could obtain a context of the surgical intervention as further input. Corresponding context information could indicate for example a type of the operation, the progress of the operation, a surgeon of the operation, etc. Such supplementary information may be helpful for purposefully controlling the assistance functionality.

In the various variants described herein, at least one control algorithm can be used which obtains the map—provided as output by the machine-learned algorithm—as input.

The at least one control algorithm can then provide control data for the assistance functionality as output. The control data could be transferred for example to one or more actuators of pieces of equipment (e.g. the surgical microscope) which are used during the surgical intervention. The control data could also be transferred to a human-machine interface, for example in order to output user guidance to the surgeon of the surgical intervention.

Put generally, the control data can define at least one out of a type of the assistance functionality and a point in time of the assistance functionality.

By way of example, it would be conceivable that in principle different actions of the assistance functionality can be performed and a selection is made between the different actions depending on the content of the map. It would alternatively or additionally be possible for an action to be performed earlier or later, depending on the content of the map.

The control algorithm obtains the map as input. In the various examples it would be possible for the control algorithm to obtain one or more further inputs. For example, the control algorithm could obtain the context of the surgical intervention as further input. Details in connection with the context of the surgical intervention have already been described above in connection with a further input for the machine-learned algorithm that provides the map as output; corresponding details are also applicable in connection with the control algorithm.

The control algorithm could take account of a predefined set of rules. By way of example, the set of rules could be transferred to the control algorithm as further input. The set of rules could also be fixedly predefined.

The set of rules can define e.g. boundary conditions for the choice of the control data depending on one or more features of the map. In this way, for example, it is possible to ensure a continuity in the provision of the assistance functionalities. For example, abrupt changes in the actions provided by the assistance functionalities can be avoided. User-specific preferences could be taken into account.

The set of rules could define temporal smoothing of actions of the assistance functionalities, for example. For this purpose, either low-pass filtering of corresponding actions could be carried out on the output side. Temporal variation of a plurality of maps obtained successively by the machine-learned algorithm could also be taken into account on the input side. For example, corresponding low-pass filtering could be applied to a corresponding time series of maps obtained successively by the machine-learned algorithm.

Exemplary rules of the set of rules could be, for example: "An action of assistance functionality is carried out only if more than one instrument of the surgical instruments is visible in the microscopy images"; or "The focus of the surgical microscope is not adjusted to one set of surgical instruments which, if more than two sets of surgical instruments appear, is not arranged in the spatial neighborhood of at least one other set of surgical instruments".

The set of rules could also determine how an order of activity areas is to be determined, for instance depending on features concerning context information of the activity areas, as already discussed above. The assistance functionality can then be controlled depending on such an order.

Exemplary rules that can be taken into account depending on such an order would be, for example: "If the tool tips of a plurality of surgical instruments are situated in spatial proximity, then an increased importance is ascribed to the corresponding activity area for a further dependent decision"; or "If two surgical instruments are situated in the activity area and are thus in spatial proximity, then the corresponding activity area is given a higher weighting than other activity areas".

As a general rule, a wide variety of assistance functionalities can be controlled in the various examples described herein. By way of example, assistance functionalities can be controlled which are connected with the surgical microscope that captures the at least two microscopy images on the basis of which the map is created. However, it would also be conceivable for assistance functionalities that do not concern the surgical microscope to be controlled; for example, such assistance functionalities could concern other pieces of equipment that are used in connection with the surgical intervention, or else enable user guidance via a human-machine interface.

It would be conceivable, for example, for the assistance functionality to be selected from a group comprising the following elements: repositioning the surgical microscope; changing a magnification factor of the surgical microscope; adapting a focus of the surgical microscope; adapting an illumination of the intervention region by an illumination by the surgical microscope.

For example, it would be conceivable for the assistance functionalities to reposition the surgical microscope, on the basis of a distance between at least one of the one or more activity areas and a center of the field of view of the surgical microscope. That means, in other words, that a recognized activity area can be arranged in the center of the field of view of the surgical microscope ("auto-centering").

By way of example, a description has been given above of techniques for defining an order of the activity areas, for instance on the basis of features describing context information of the activity areas, i.e. e.g. on the basis of spatial and/or anatomical neighborhood relationships between the activity areas or in relation to the anatomy of the patient. Then a corresponding activity area could be selected on the basis of this order and the surgical microscope could be centered with respect to this activity area. Such techniques are based on the insight that it is often particularly important for a surgeon to position a specific activity area centrally in the field of view in order to make progress with the surgical intervention there in a targeted manner. The assistance functionality can thus be provided particularly purposefully.

A computer program or a computer program product or a computer-readable storage medium comprises program code. The program code can be loaded and executed by a processor. When the processor executes the program code, this causes the processor to carry out a method for controlling an assistance functionality for a surgical intervention on a patient. The method comprises applying a machine-learned algorithm in order to obtain a map of the intervention region. This applying is based on at least two microscopy images. The at least two microscopy images were captured by means of a surgical microscope and image an intervention region of the surgical intervention. The at least two microscopy images were captured at different points in time. The method additionally comprises using the map in order to control an assistance functionality in connection with the surgical intervention. In this case, the map is indicative of one or more activity areas in the intervention region which are associated with an increased probability for the presence of surgical instruments.

A control apparatus for controlling an assistance functionality for a surgical intervention on a patient is configured to apply a machine-learned algorithm on the basis of at least two microscopy images in order to obtain a map of an intervention region in this way. The at least two microscopy images are captured by means of a surgical microscope and image the intervention region. The at least two microscopy images are captured at different points in time. The control apparatus is additionally configured to use the map to control an assistance functionality in connection with the surgical intervention. The map is indicative of one or more activity areas in the intervention region which are associated with an increased probability for the presence of surgical instruments.

A system could comprise the control apparatus and the surgical microscope, for example.

The surgical microscope can have an actuator for repositioning the surgical microscope.

The assistance functionality could then comprise repositioning the surgical microscope.

The features set out above and features that are described below can be used not only in the corresponding combinations explicitly set out, but also in further combinations or in isolation, without departing from the scope of protection of the present disclosure.

DETAILED DESCRIPTION OF EMBODIMENTS

Figure 1:
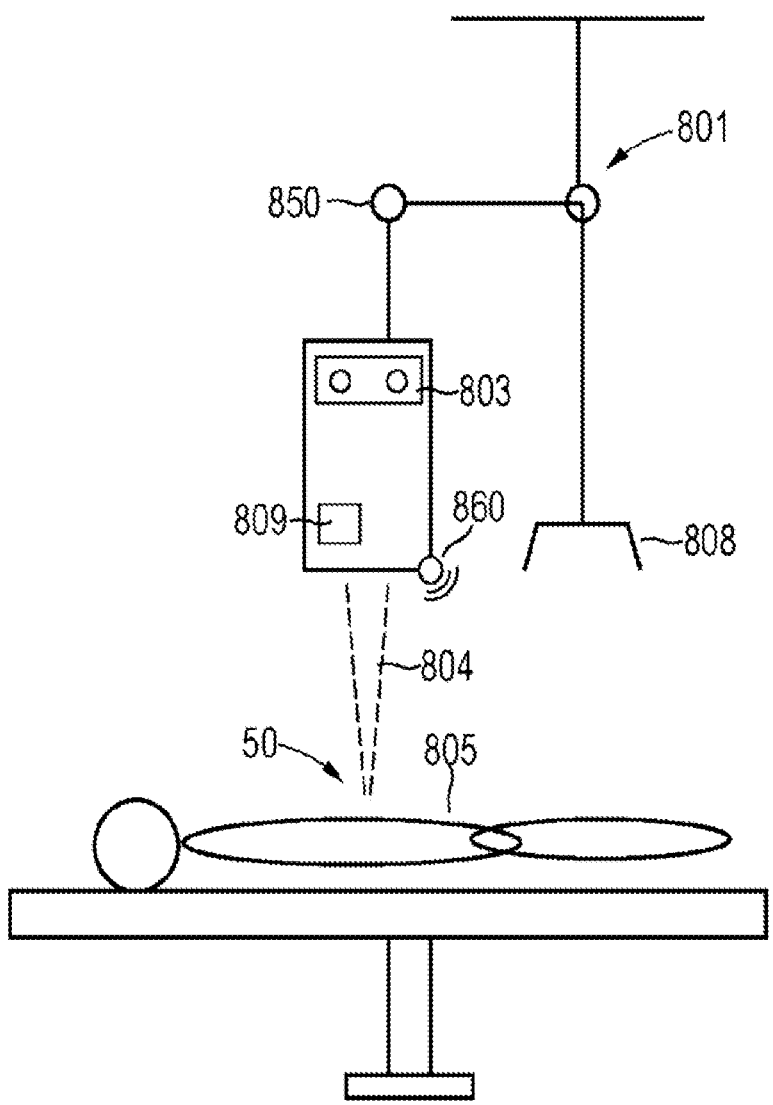
FIG. 1 schematically illustrates a surgical microscope in accordance with various examples.

The properties, features and advantages of this disclosure described above and the way in which they are achieved will become clearer and more clearly understood in association with the following description of the exemplary embodiments which are explained in greater detail in association with the drawings.

The present disclosure is explained in greater detail below on the basis of preferred embodiments with reference to the drawings. In the figures, identical reference signs denote identical or similar elements. The figures are schematic representations of various embodiments of the disclosure. Elements illustrated in the figures are not necessarily illustrated as true to scale. Rather, the various elements illustrated in the figures are rendered in such a way that their function and general purpose become comprehensible to a person skilled in the art. Connections and couplings between functional units and elements as illustrated in the figures can also be implemented as an indirect connection or coupling. A connection or coupling can be implemented in a wired or wireless manner. Functional units can be implemented as hardware, software or a combination of hardware and software.

Various examples of the disclosure relate to techniques for controlling an assistance functionality while a surgical intervention is being carried out. A wide variety of types of assistance functionalities can be controlled in the various examples described herein.

By way of example, an assistance functionality that provides user guidance for a surgeon of the surgical intervention could be controlled. It would also be possible for a surgical microscope or other pieces of equipment used in the surgical intervention (e.g. a microinspection tool or a confocal endomicroscope) to be controlled. The assistance functionality can also provide different types of actions.

Various examples of the disclosure relate to the determination of a setting of a surgical microscope during the operation. In the various examples described herein, different settings of the surgical microscope can be determined, in the context of the assistance functionality. By way of example, it would be conceivable for relative positioning of the surgical microscope in relation to the patient undergoing the operation to be determined, i.e. a distance and/or orientation (pose). Alternatively or additionally, settings of the optical system in the surgical microscope could also be determined, for example a magnification (zoom), an illumination intensity and/or a contrast. An operating mode could also be determined, for example the use of indirect or direct illumination, or illumination with light at a certain wavelength. A fluorescence mode could be activated. Video settings could be set.

Various examples are based on the insight that manual determination and application of settings—for instance manual repositioning of the surgical microscope—may constitute an additional cognitive and mental load for the executing surgeon during the operation. By way of example, manual repositioning requires a "free hand", and so the surgeon must put down the surgical instruments or wait for a pause for a change of the surgical instruments. If the surgical instruments are put down in a dedicated step, manual repositioning leads to an interruption of the operation. If the surgeon waits for a suitable window of opportunity for the repositioning, there is the risk of the surgeon at least in part carrying out the operation with sub-optimal settings for the surgical microscope. The positioning of the surgical microscope may often require a great deal of experience. Accordingly, in accordance with the various examples described herein, it is possible to automatically determine the settings of the surgical microscope in the context of a corresponding assistance functionality and thus to relieve the burden on the surgeon.

As a general rule, the assistance functionality can be controlled fully automatically or semi-automatically. By way of example, corresponding settings which have been described above in connection with the surgical microscope could be applied automatically or corresponding user guidance could be output.

In the various examples described herein, the assistance functionality is controlled on the basis of the recognition of surgical instruments in an intervention region of the surgical intervention. The surgical instruments can be recognized, but need not necessarily be localized. The surgeon works with the surgical instruments and the assistance functionality can accordingly be coordinated with the cognitive focus of the surgeon when working with the surgical instruments. The recognition of the surgical instruments makes it possible to ensure that an increased activity is not caused by artefacts or disturbances—but rather is actually caused by the purposeful manipulation by a surgeon. A continuous human-machine interaction becomes possible in this way.

Reference implementations that recognize the surgical instruments in the intervention region are conceivable. One example is described e.g. in U.S. Ser. No. 10/769,443B. By way of example, a reference implementation is based on attaching reference markings on the surgical instruments. It is then possible to track and recognize the reference markings. Electromagnetic tracking or optical tracking, for example, would be conceivable. One disadvantage of such a marker-based reference implementation is that it is necessary to attach the reference markings on the surgical instruments. In addition, separate hardware outlay may be necessary in order to capture corresponding data enabling tracking of the positioning on the basis of the recognized reference markings. A different class of reference implementations uses markerless recognition of surgical instruments. For example, an image processing algorithm could be used to recognize the different types of surgical instruments in microscopy images of a surgical microscope. Such an approach may exhibit comparatively little robustness. This is due to the fact that there is a great variability of colors and shapes of surgical instruments. The parameterization or training of a corresponding algorithm for recognizing the surgical instruments is therefore often complex and beset by errors. The parameter space to be recognized is also expanded by the multiplicity of types of surgical instruments.

Both in the case of the marker-based recognition of surgical instruments and in the case of the markerless recognition of surgical instruments, it is typically necessary to take account of variations in the image properties—for instance depth of field, illumination, shading, reflections, contrast, varying fluorescent light—in order to obtain a robust technical solution. Such variations in the image properties may arise as a result of different imaging modalities which can be activated or deactivated—depending on the type of surgical microscope used. However, the different image properties may also arise by virtue of the fact that, for example, background illumination is different, for example depending on the operating room.

In the various techniques described herein, the assistance functionality can be controlled robustly, taking account of the probable position of surgical instruments. This can be done tool-type agnostically, in particular. Disadvantages such as have been outlined above in association with reference implementations, can be overcome.

In accordance with various examples, explicit recognition and/or localization of surgical instruments and classification of types of the surgical instruments are thus dispensed with—in contrast to the reference implementations described above. An implicit approach that uses activity areas associated with an increased probability for the presence of surgical instruments is used instead of such explicit recognition of surgical instruments. The activity areas can be derived from a comparison of at least two microscopy images. In particular, the activity areas can correspond to such regions of the at least two microscopy images in which there is an increased dynamic characteristic, for example increased activity or increased movement. Such techniques are based on the insight that relevant surgical instruments are typically moved and therefore appear with an increased dynamic characteristic in a series of microscopy images. In particular, the dynamic characteristic is increased in relation to the relatively static background, for example tissue and surgical instruments after having been fixed, such as clamps, etc. That means that the temporal context can be utilized for recognizing the activity areas. In other words, an increased activity can be determined by determining an increased dynamic characteristic or an increased movement in the activity areas which may have an increased measure of dynamic characteristic or movement in comparison with the other areas, i.e. the areas which are not activity areas. A measure of an increased activity can comprise for example a measure of a dynamic characteristic or a movement, for example a speed or distance of a movement, or an optical flow, generally a temporal context and/or spatial context, within the activity area, which is accounted for by movement of surgical instruments, this being able to be imaged in the at least two microscopy images. Furthermore, an increased probability for the presence of surgical instruments in the activity area can be determined on the basis of the increased activity, in other words on the basis of the determination of an increased activity.

In accordance with the various examples, such activity areas can be stored as features in a map of the intervention region. This enables in particular abstraction from specific properties of the imaging modality, such as contrast, illumination, shadow casting, etc. This is made possible by taking account of relative changes in a series of at least two microscopy images. Static properties, including properties of the imaging modality, can then be recognized and be disregarded in the creation of the map. As a result, the assistance functionality can be controlled particularly robustly.

FIG. 1 schematically shows a surgical microscope 801 for surgery. In the illustrated example, the surgical microscope 801 comprises an eyepiece 803. Through the eyepiece 803, the surgeon can observe magnified images of an object which is situated in a field of view 804 of the surgical microscope 801. In the illustrated example, this is a patient 805 lying on a patient couch.

As an alternative or in addition to an optical eyepiece, provision could also be made of a camera which provides microscopy images (digital surgical microscope).

An operating device 808 is also provided as a human-machine interface; by way of example, it can be embodied as a handle or a foot switch. It is a handle in the embodiment illustrated in FIG. 1. The operating device 808 allows the eyepiece 803, which is fastened to crossbeams 850, to be moved. Motors can be provided in order to automatically carry out the movement on the basis of control data, in accordance with a corresponding setting of the surgical microscope. The motors could also assist the movement instigated by the handle 808.

Furthermore, a control device 809 is provided for the surgical microscope 801 and controls the operation of the combination microscope and the display of images and additional information and data in the eyepiece 803. The control device 809 can carry out an interaction with the surgeon. By way of example, the control device 809 could alter a setting of the surgical microscope on the basis of appropriate control data. For this purpose, one or more actuators can be controlled, for instance in order to move the crossbeam, to change an optical unit, etc. The setting can also comprise the digital postprocessing of sensor data. The setting could also relate to data capture parameters, for instance for captured digital images. It would also be possible to switch between different image sources or imaging modes, depending on the setting. Such settings can be performed at least partly in an automated manner by way of an assistance functionality.

The surgical microscope 801 can also comprise one or more further sensors 860, for instance a motion sensor or a thermal imaging camera or a microphone or a surround camera, etc. Such further sensors 860 can also be operated differently depending on the setting of the surgical microscope. Such sensors 860 can provide context information describing the context of a surgical intervention.

In neurosurgery, surgical microscopes are used to visualize an intervention region. Such an intervention region is often characterized by low-lying structures in narrow cavities. Depending on the type of operation it is necessary for the surgical microscope to adopt a new viewing direction relative to the intervention region approximately every minute since a new concealment situation arises, by way of example, on account of altered positions of the instruments. In surgical microscopes that are currently commercially available it is necessary to this end for the surgeon to reposition the system manually, i.e. they clasp e.g. a handle attached to the microscope and guide the system into a new pose (position & orientation of the microscope). In various examples described herein, an assistance functionality can support or even automate such repositioning. In this case, however, the assistance functionalities described herein are not restricted to corresponding repositioning of the surgical microscope. It would also be conceivable, alternatively or additionally, to alter other settings of the surgical microscope, for instance to set the magnification factor, to adapt the focus, to adapt the illumination, etc. In some examples, it would even be possible for the assistance functionality not to concern the setting of the surgical microscope, rather a different piece of equipment is set, for instance an operating table on which the patient lies, a microinspection tool or a confocal endomicroscope, etc. A human-machine interface could also be controlled in the context of the assistance functionalities in order to implement user guidance.

Figure 2:
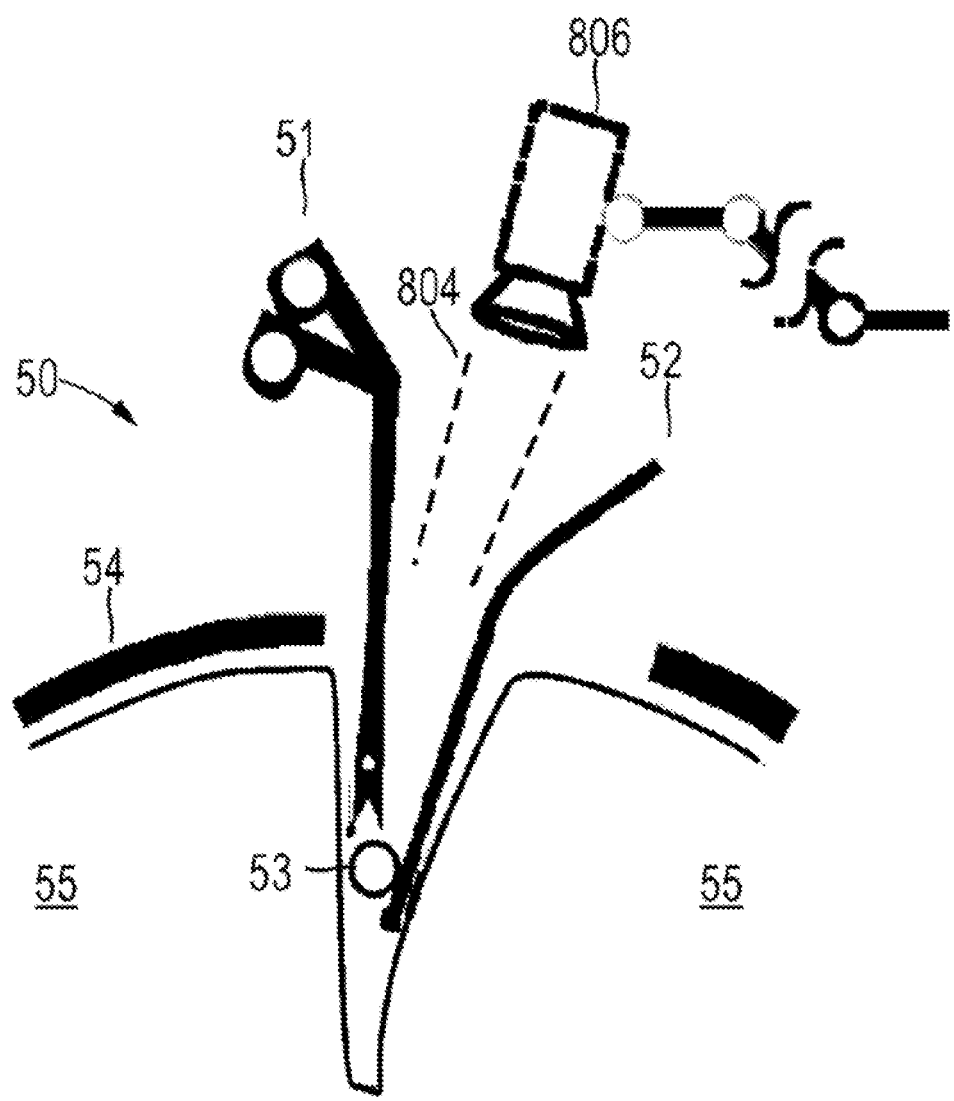
FIG. 2 schematically illustrates a target region of an operation and the relative positioning of the surgical microscope in relation to the target region in accordance with various examples.

FIG. 2 illustrates an exemplary positioning of an optical unit 806 of the surgical microscope 801 in relation to a situs 53 within the skullcap 54 of the patient. All that defines an intervention region 50 (cf. also FIG. 1). Surgical instruments 51, 52 arranged in the intervention region 50 are additionally illustrated.

Figure 3:
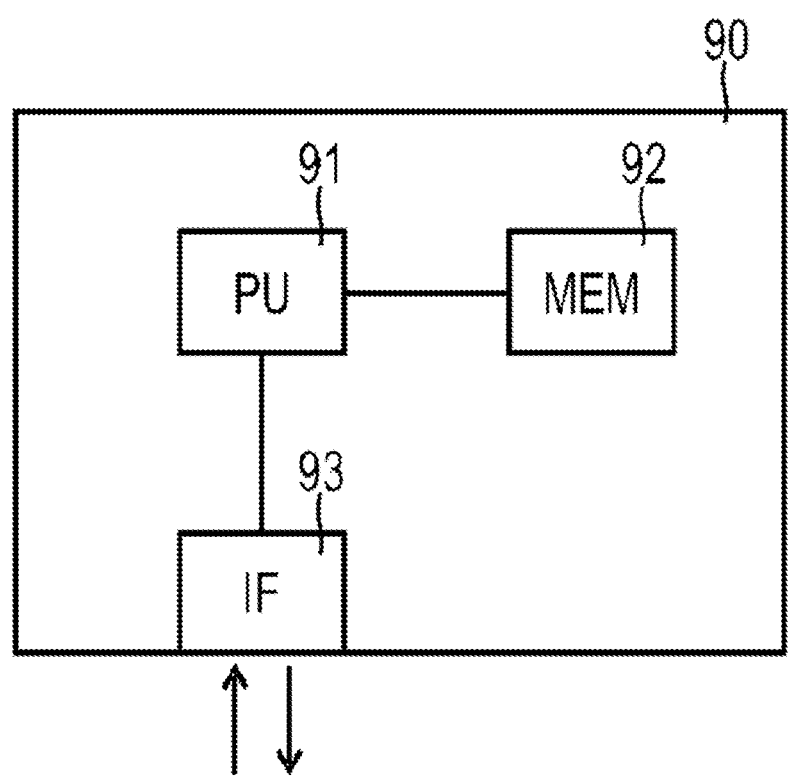
FIG. 3 schematically illustrates a device which can be used in connection with the various examples described herein in order to evaluate microscopy images and/or to control an assistance functionality.

FIG. 3 schematically illustrates a device 90 that can be used for the data processing in the various examples described herein. By way of example, the device 90 could be a PC or a cloud server. The device 90 could implement a control apparatus for controlling an assistance functionality. The device 90 could be part of the control device 809 of the surgical microscope 801.

The device 90 comprises a processor unit 91 and a nonvolatile memory 92. The processor unit 91 can load program code from the nonvolatile memory 92 and execute said code. This has the effect that the processor unit 91 executes techniques in accordance with the examples described herein, for example applying a machine-learned algorithm in order to obtain a map of the intervention region, in which activity areas are marked; training the machine-learned algorithm on the basis of training data; applying a preprocessing algorithm to a series of microscopy images, wherein an output of the preprocessing algorithm serves as input into the machine-learned algorithm; applying a control algorithm that obtains the map as input in order to provide control data for an assistance functionality; etc.

Details concerning an exemplary implementation of the processing of data—for instance by means of the device 90—are illustrated below in association with FIG. 4.

Figure 4:
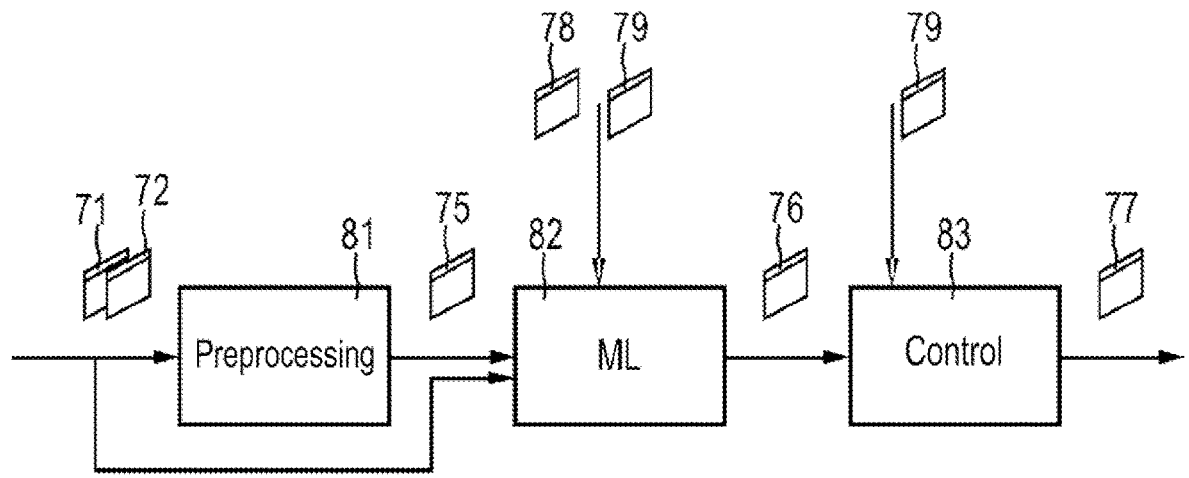
FIG. 4 schematically illustrates exemplary data processing.

FIG. 4 illustrates aspects in connection with the data processing for controlling assistance functionalities in accordance with various examples of the present disclosure. The data processing in accordance with FIG. 4 could be carried out by the device 90, for example, in particular by the processor unit 91, on the basis of program code that is read from the nonvolatile memory 92.

FIG. 4 illustrates that two microscopy images 71, 72 are obtained. The microscopy images 71, 72 can image the intervention region 50 and can be captured by the surgical microscope 801. The two microscopy images 71, 72 are used as input by a preprocessing algorithm 81 (that is generally optional, however; preprocessing could also be carried out).

As a general rule, in the various examples described herein, it is also possible to use more than two microscopy images 71, 72 in order to determine a map.

The optional preprocessing algorithm 81 provides an output 75, which in turn serves as input for a machine-learned algorithm 82. For example, it would be possible for the preprocessing algorithm 81 to determine a combination image on the basis of the combination of the two microscopy images 71, 72. The combination can be implemented for example by means of difference formation or summation. The combination image depicts the dynamic characteristic between the different microscopy images 71, 72. Further information could also be extracted from the microscopy images 71, 72, for example depth information in a topography image.

The machine-learned algorithm 82 obtains the output 75 of the preprocessing algorithm 81—for instance the combination image or a topography image, as described above—as input. The machine-learned algorithm could also obtain further inputs. FIG. 4 illustrates that the machine-learned algorithm 82 also receives both microscopy images 71, 72 as further input (if no preprocessing is carried out, the machine-learned algorithm 82 could also obtain only the microscopy images 71, 72).

In addition, the machine-learned algorithm 82 could obtain, as further inputs, sensor data 78 from additional sensors of the surgical microscope—cf. FIG. 1: sensors 860. The machine-learned algorithm 82 could additionally or alternatively also obtain state data 79 describing the context of the surgical intervention. By way of example, other microscopy images—for instance captured by means of an endoscope—could also be obtained.

The machine-learned algorithm 82 provides a map 76. The map 76 maps the intervention region 50 by using features of specific predefined feature classes. In particular, one or more activity areas which are associated with an increased probability for the presence of surgical instruments are recorded in the map 76. The map can then be used to control the assistance functionality. For this purpose, in various examples, as also illustrated in FIG. 4, a control algorithm 83 can be applied to the map 76 in order thus to obtain control data 77 so as to suitably set the surgical microscope 801.

FIG. 4 illustrates that the control algorithm 83—as an alternative or in addition to the machine-learned algorithm 82—could obtain the state data 79 describing the context of the surgical intervention as further input. Context-dependent control of the assistance functionalities can be made possible as a result.

Generally, the control algorithm 83 could take account of a predefined set of rules defining boundary conditions for the choice of the control data depending on one or more features of the map 76. The set of rules could define temporal smoothing of actions of the assistance functionalities, for example. The set of rules could define an order of a plurality of activity areas, for example. This order may then have effects on the control of the assistance functionality.

The data processing in FIG. 4 is structured modularly, in principle. By way of example, the preprocessing algorithm 81 is optional, in principle. It would be conceivable, for example, for the machine-learned algorithm 82 to obtain the microscopy images 71, 72 directly as input. The control algorithm 83 could be integrated into the machine-learned algorithm 82. In this respect, FIG. 4 merely illustrates one exemplary architecture of the data processing.

Figure 5:
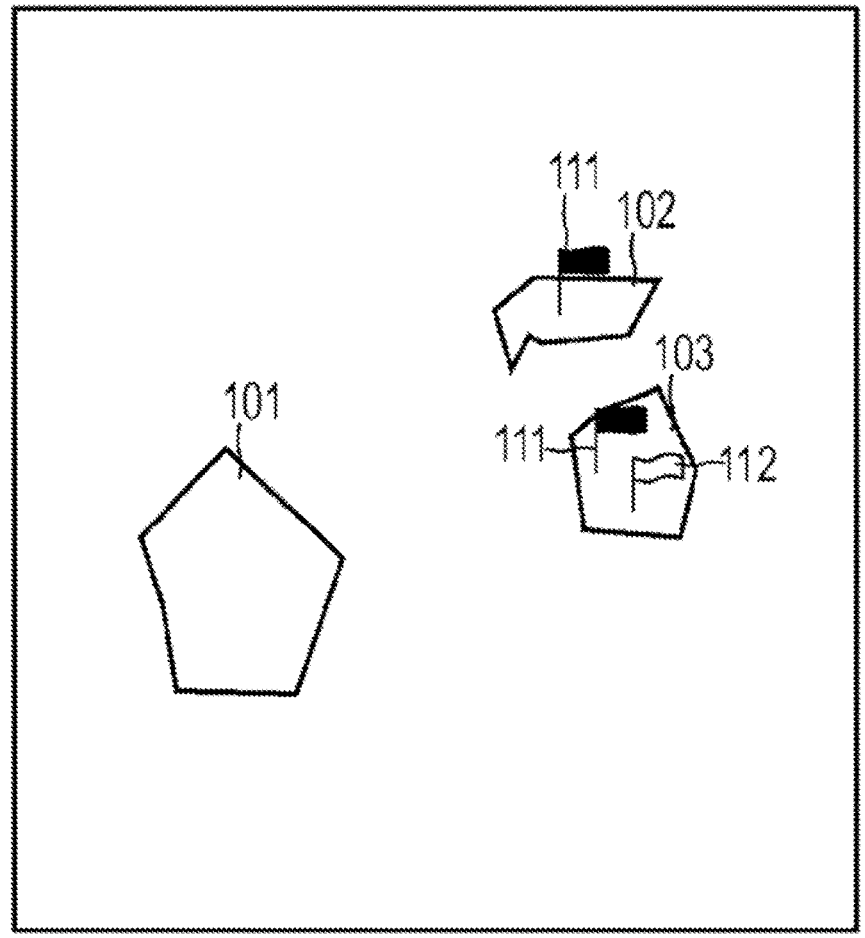
FIG. 5 schematically illustrates activity areas in a corresponding map in accordance with various examples.

FIG. 5 illustrates aspects in connection with the map 76. Three activity areas 101-103 are recorded in the map 76 (the contours of the activity areas 101-103 are illustrated in the example in FIG. 5). One or more sets of surgical instruments are positioned in each of the activity areas with increased probability.

However, the map 76 does not differentiate between different types of surgical instruments. Accordingly, the assistance functionalities are also not controlled depending on the different types of surgical instruments. The map 76 thus includes features in the form of the activity areas 101-103 which describe the presence of the surgical instruments at different positions within the intervention region 50. On the other hand, surgical instruments need not be localized on the basis of object recognition (in other words: the map 76 can be created agnostically concerning the cause of an increased activity, which increases the robustness).

Besides the features of the activity areas 101-103, the map 76 in the example illustrated also includes further features, namely in the form of the markings 111-112. That is generally optional. These features describe context information for the activity areas. The activity area 102 is provided with the marking 111, and the activity area 103 is provided both with the marking 111 and with the marking 112.

In this case, the marking 111 identifies the fulfillment of a spatial neighborhood relationship by the activity area 102, 103 respectively marked. In the example illustrated, the two activity areas 102, 103 are arranged close together—for instance closer than a specific predefined threshold value—and thus fulfill the corresponding spatial neighborhood relationship. By contrast, the activity area 101 does not have particularly close neighbors and therefore does not fulfill the corresponding spatial neighborhood relationship.

The marking 112 identifies the fulfillment of a corresponding anatomical neighborhood marking by the corresponding activity area 103. By way of example, it would be conceivable for the activity area 103 to be arranged particularly close to a specific anatomical structure, for example particularly close to the situs 53. By way of example, anatomical features could be localized as anatomical context by the preprocessing algorithm 81 and transferred to the machine-learned algorithm 82 as further input.

Put generally, the markings 111-112 provide context information in connection with the activity areas 101-103. Such context information can be taken into account when the assistance functionality is controlled. In the various examples described herein, it is conceivable for the activity areas 101-103 of the map 76 to be sorted on the basis of such context information and for a corresponding order to be used in order to control the assistance functionality. By way of example, the set of rules of the control algorithm could define how the order is determined, i.e. e.g. what context information is taken into account or how different context information-describing features of the map 76 are weighted when determining the order.

The spatial and anatomical neighborhood relationships have been described above as examples of the context information; in general, however, other or further types of context information can also be taken into account. By way of example, the map 76 could include further features indicative of a number of surgical instruments in a respective activity area 101-103 and/or a dynamic characteristic in the respective activity area 101-103. All of such and further types of context information can be taken into account, for example, when the assistance functionality is controlled, for instance when determining the order.

Figure 6:
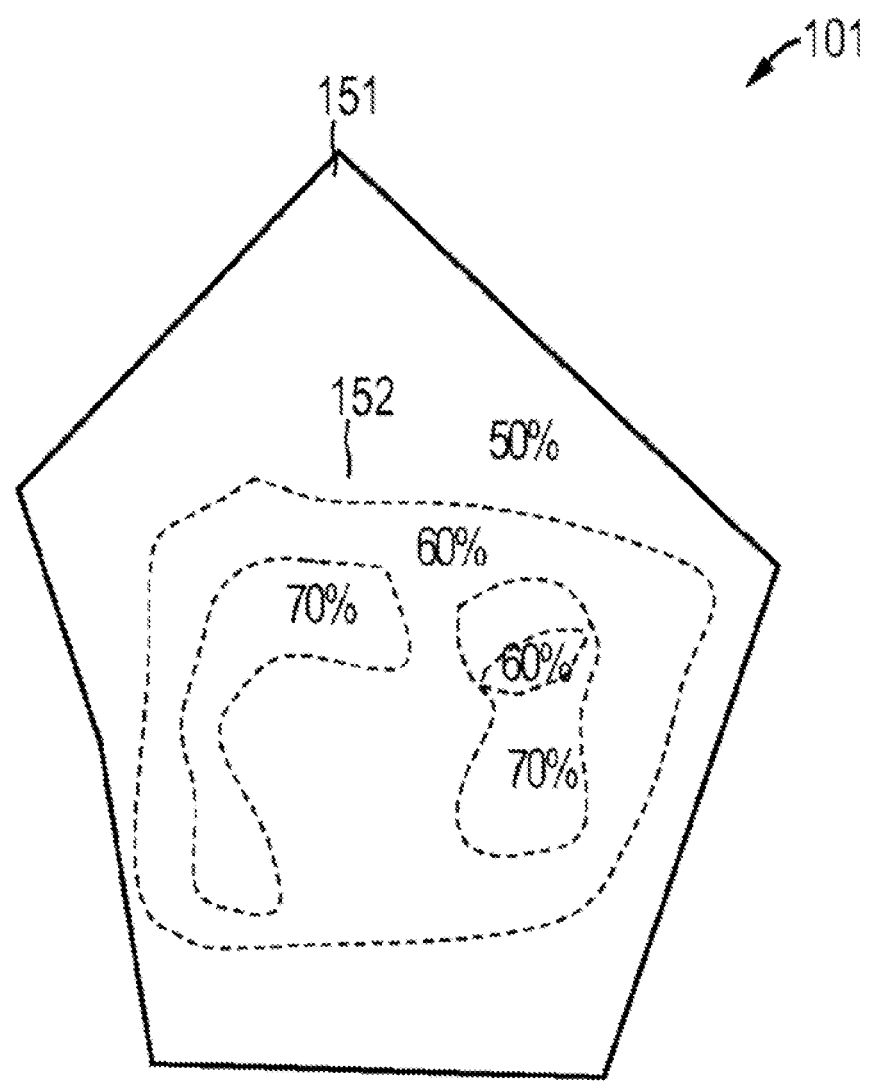
FIG. 6 illustrates further details in connection with a map representation of an activity area.

FIG. 6 illustrates aspects in connection with the activity areas 101-103. In particular, FIG. 6 illustrates, by way of example for the activity area 101, how activity areas can be rendered in the map 76. In the example in FIG. 6, firstly a mask 151 is used for the activity area 101. The mask 151 effects binary segmentation into regions within and outside the activity area 101; a contour of the mask 151 is illustrated.

As an alternative or in addition to the use of such a mask 151, the map 76 could also include probability values 152—represented by corresponding isolines in FIG. 6—for the presence or the absence of surgical instruments. The activity area can then be defined as that part of the intervention region 50 where probability values of greater than 50% (or some other threshold value) for the presence of the surgical instruments are present.

Figure 7:
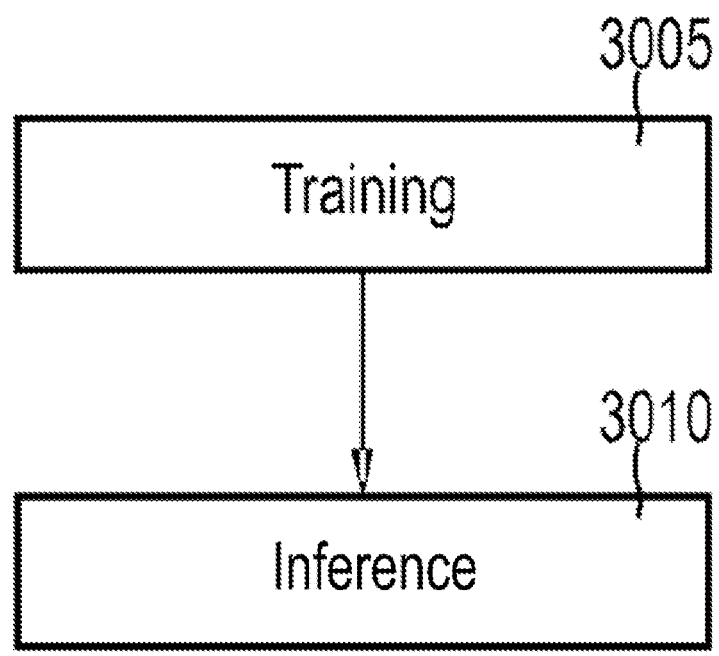
FIG. 7 is a flowchart of one exemplary method.

FIG. 7 illustrates one exemplary method. The method from FIG. 7 illustrates the different stages in connection with the operation of the machine-learned algorithm 82.

In box 3005, training of the machine-learned algorithm 82 takes place. For this purpose, ground truths are used in order to adapt parameters of the machine-learned algorithm 82 in a numerical, iterative optimization process.

In box 3010, the then trained machine-learned algorithm is used for inference, that is to say that an assistance functionality is controlled during the surgical intervention without the availability of ground truths.

The training in box 3005 can be carried out in a supervised or semi-supervised or unsupervised manner. By way of example, activity areas and optionally further features of the map could be annotated manually—the ground truths are obtained in this way—and an adaptation of parameters of the machine-learned algorithm 82 can then be effected on the basis of corresponding labels.

Figure 8:
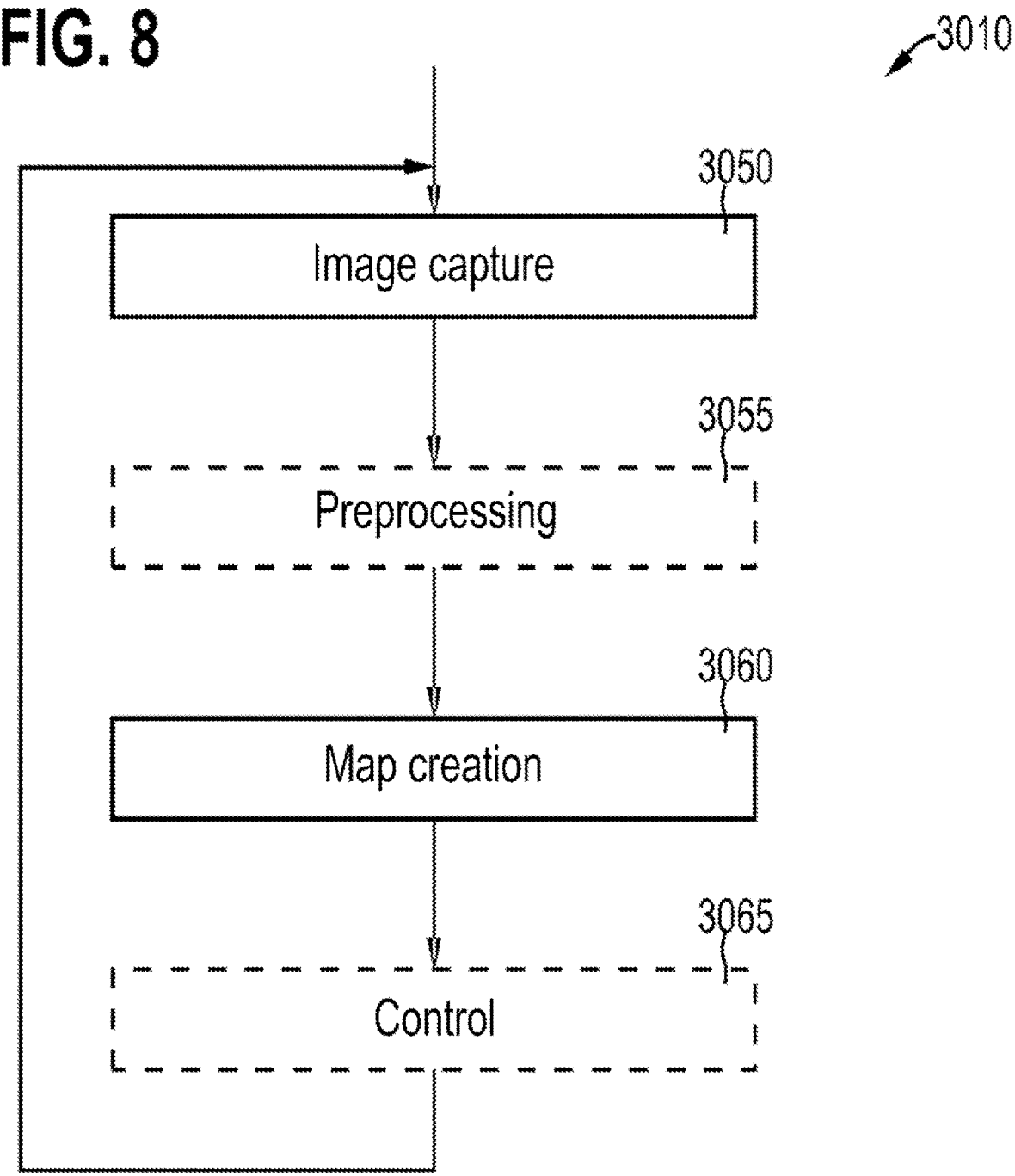
FIG. 8 is a flowchart of one exemplary method.

FIG. 8 illustrates one exemplary method. The method in FIG. 8 can be executed by a data processing system. By way of example, the method in FIG. 8 could be executed by the device 90, for instance by the processor unit 91, on the basis of program code that is read from the memory 92.

FIG. 8 illustrates aspects in connection with the inference phase from box 3010 of the method from FIG. 7. In FIG. 8, dashed boxes are optional.

In box 3050, image capture of two or more microscopy images is carried out. Stereoscopic microscopy images could be captured.

For this purpose, for example, suitable control instructions could be sent to a surgical microscope. The image data can then be received.

The two or more microscopy images can be captured with defined poses in relation to an intervention region, for example with a fixed pose.

In box 3055, preprocessing of the microscopy images from box 3050 is optionally carried out. By way of example, the optical flow can be extracted from the microscopy images from box 3050. Put generally, it is possible to determine a temporal context between the microscopy images.

Corresponding techniques have been described by way of example in association with FIG. 4 and the preprocessing algorithm 81.

In box 3060, a map that maps various feature types for the intervention region is created. The machine-learned algorithm is used for this purpose. One example would be a so-called "saliency" prediction algorithm. In particular, activity areas are mapped, as explained above in association with FIG. 5.

Put generally, the map can encode in spatially related fashion whether and, if appropriate, how probably a dynamic activity of surgical instruments is present at a specific spatial point—for instance a specific xy-pixel—or generally at a specific area in the intervention region. For example, a probability map can be output, as discussed in association with FIG. 6.

Optionally, context information for the activity areas can also be mapped. Such context information comprises, for example: dynamic characteristic in the respective activity area; number of surgical instruments in the respective activity area; spatial neighborhood relationships between the activity areas; anatomical neighborhood relationships of the activity areas; etc.

On the basis of the map from box 3060, an assistance functionality can then optionally be controlled in box 3065. By way of example, a decision could be made as to whether a specific action of the assistance functionality is intended to be initiated. If a specific action is intended to be initiated, then this can be implemented as a recommendation and/or request to the user, semi-automatic assistance or fully automatic assistance.

In some examples, it would be possible, in box 3060, to check whether one or more sets of surgical instruments are recognized in the microscopy images. This can be done on the basis of an object recognition algorithm. Localization of the surgical instruments need not be carried out. If one or more sets of surgical instruments are recognized, the assistance functionality can subsequently be initiated. By way of example, the object recognition algorithm could output "yes" if one or more sets of surgical instruments are recognized in the microscopy images. The object recognition algorithm can output "no" if no sets of surgical instruments are recognized. In other words, that corresponds to a binary result. The number of sets of surgical instruments recognized could also be output. The position need not be indicated.

In some examples, as an alternative or in addition to the initiation criterion "surgical instruments recognized", it would also be conceivable for the initiation of an assistance functionality to be dependent on one or more other initiation criteria. One example would be e.g. a voice command, for instance "centering", or the actuation of a button, for instance of a foot switch.

Such an object recognition algorithm can be used temporally in parallel and for example independently with respect to the algorithm that determines the map in box 3060 (cf. FIG. 4: algorithm 82).

The object recognition algorithm can thus be used for plausibilization as to whether an increased activity in an activity area actually stems from the use of surgical instruments by a surgeon—or else is caused e.g. by image artefacts or variable shadow casting or other disturbances. It is only if surgical instruments are recognized that it can be assumed that the activity area is determined by the activity of a surgeon. This can serve as an initiation criterion for the assistance functionality. In connection with the assistance functionality, a control algorithm that receives the map from box 3060 as input could be used, for example. Corresponding techniques have been described for example in association with the control algorithm 83 from FIG. 4.

The assistance functionality could place e.g. an activity area in the center of the field of view of the microscope. For this purpose, it is possible to control e.g. a robotic arm for the repositioning of the microscope.

Boxes 3050-3065 can be repeatedly executed in order to control the assistance functionality in an up-to-date fashion in each case.

In summary, therefore, a description has been given of techniques which made it possible to implicitly recognize activity in an intervention region during a surgical intervention. The semantic meaning of a corresponding activity can be extracted, without the need for explicitly differentiating between different types of surgical instruments. A corresponding map can indicate activity areas. It is then possible to control an assistance functionality depending on the map. By way of example, a check can be made to establish whether or not one or more actions of the assistance functionality are intended to be initiated.

The way in which microscopy images can be captured by means of a surgical microscope has been described. Microscopy images can be captured at different points in time.

On the basis of such microscopy images, it is then possible to determine a combination image that is indicative of the optical flow as a measure of the change between the two microscopy images. The microscopy images can also be transferred directly to the machine-learned algorithm. The microscopy images could also be fused with the combination image.

A control algorithm can be used in order to control the assistance functionality. Said algorithm could take account of one or more predefined rules, for example. Examples of rules would be that a specific action of the assistance functionality is performed only if two or more activity areas are recognized, which optionally fulfill a specific spatial neighborhood relationship.

It goes without saying that the features of the embodiments and aspects of the disclosure described above can be combined with one another. In particular, the features can be used not only in the combinations described but also in other combinations or on their own, without departing from the scope of the disclosure.

By way of example, a description has been given above of techniques in which a map that is indicative of one or more activity areas is created for a single intervention region. As a general rule, it would be possible to create a plurality of maps for a plurality of intervention regions—which are visible for example next to one another in microscopy images. For this purpose, the techniques described herein can be applied in each case for each of the plurality of maps.

Furthermore, a description has been given above of techniques in which two or more microscopy images are used which were captured at different points in time. It would be possible, in principle, to use a series of microscopy images which are captured during a time range, some of the microscopy images being captured at different points in time within the time range and optionally some of the microscopy images being captured at the same points in time within the time range. That means that at least for some points in time within the time range, there may be redundant information as a result of a plurality of microscopy images which are captured for example by means of different imaging optical units or using a plurality of imaging modalities. Multimodal imaging would be possible. It would be possible for such multimodally and/or redundantly captured microscopy images then to be fused.

The invention claimed is:

1. A method for controlling an assistance functionality for a surgical intervention on a patient, the method comprising:
   on the basis of at least two microscopy images which were captured by means of a surgical microscope and which image an intervention region of the surgical intervention and which were captured at different points in time, applying a machine-learned algorithm in order to obtain a map of the intervention region, and
   using the map in order to control an assistance functionality in connection with the surgical intervention,
   wherein the map is indicative of one or more activity areas in the intervention region which have an increased activity and are associated with an increased probability for the presence of surgical instruments as a result of the increased activity,
   wherein the map includes probability values for the presence or absence of surgical instruments for a plurality of areas of the intervention region,
   wherein the one or more activity areas are localized at the areas with increased probability values, and
   wherein the assistance functionality is selected from a group comprising the following elements: repositioning the surgical microscope; changing a magnification factor of the surgical microscope; adapting a focus of the surgical microscope; adapting an illumination of the intervention region by the surgical microscope.

2. The method of claim 1, wherein the map is agnostic concerning different types of surgical instruments; and
   wherein the assistance functionality is controlled agnostically concerning the different types of surgical instruments.

3. The method of claim 1, wherein the map comprises a mask for the one or more activity areas.

4. The method of claim 1, wherein the map comprises one or more features which indicate context information for the one or more activity areas.

5. The method of claim 4, wherein the one or more features which comprise context information for the one or more activity areas are indicative of fulfillment of one or more spatial neighborhood relationships by groups of activity areas of the one or more activity areas; and/or
   wherein the one or more features which comprise context information for the one or more activity areas are indicative of fulfillment of one or more anatomical neighborhood relationships of activity areas of the one or more activity areas; and/or
   wherein the one or more features which comprise context information for the one or more activity areas are indicative of a number of surgical instruments in the one or more activity areas; and/or
   wherein the one or more features which comprise context information for the one or more activity areas are indicative of a dynamic characteristic in the one or more activity areas.

6. The method of claim 4, further comprising:
   determining an order of the one or more activity areas on the basis of the one or more features which comprise context information for the one or more activity areas,
   wherein the assistance functionality is controlled depending on the order.

7. The method of claim 1, wherein the machine-learned algorithm obtains as input a combination image, which is determined on the basis of a combination of the at least two microscopy images and which encodes the optical flow, for example, and/or the at least two microscopy images and/or a context of the surgical intervention.

8. The method of claim 1,
   wherein using the map in order to control the assistance functionality in connection with the surgical intervention comprises:
   applying at least one control algorithm which obtains the map or data determined based on the map as input in order to obtain control data for the assistance functionality.

9. The method of claim 8,
   wherein the control algorithm obtains a context of the surgical intervention as further input, and/or
   wherein the at least one control algorithm takes account of a predefined set of rules defining boundary conditions for the choice of the control data depending on one or more features of the map.

10. The method of claim 1, wherein the method furthermore comprises:
    recognizing the presence of surgical instruments in the at least two microscopy images by means of an object recognition algorithm,
    wherein the assistance functionality is initiated only if a presence of surgical instruments is recognized in the at least two microscopy images.

11. The method of claim 10, wherein the object recognition algorithm does not carry out localization of the surgical instruments in the at least two microscopy images.

12. The method of claim 1, further comprising:
based on the map that includes the probability values, determining a mask for the one or more activity areas,
wherein the assistance functionality is controlled based on the mask.

13. A control apparatus for controlling an assistance functionality for a surgical intervention on a patient, wherein the control apparatus is configured to carry out the following steps:
on the basis of at least two microscopy images which were captured by means of a surgical microscope and which image an intervention region of the surgical intervention and which were captured at different points in time, applying a machine-learned algorithm in order to obtain a map of the intervention region, and
using the map in order to control an assistance functionality in connection with the surgical intervention,
wherein the map is indicative of one or more activity areas in the intervention region which have an increased activity and are associated with an increased probability for the presence of surgical instruments as a result of the increased activity,
wherein the map includes probability values for the presence or absence of surgical instruments for a plurality of areas of the intervention region,
wherein the one or more activity areas are localized at the areas with increased probability values, and
wherein the assistance functionality is selected from a group comprising the following elements: repositioning the surgical microscope; changing a magnification factor of the surgical microscope; adapting a focus of the surgical microscope; adapting an illumination of the intervention region by the surgical microscope.

14. A system, comprising:
the control apparatus as set forth in claim 13, and
the surgical microscope with an actuator for repositioning the surgical microscope; and
wherein the assistance functionality comprises the repositioning of the surgical microscope.

* * * * *